UNITED STATES PATENT OFFICE.

HEINRICH HEIMANN AND PAUL VIRCK, OF DESSAU, GERMANY, ASSIGNORS TO ACTIEN GESELLSCHAFT FÜR ANILIN FABRIKATION, OF BERLIN, GERMANY.

SULFUR DYES AND PROCESS OF MAKING SAME.

1,099,039.  Specification of Letters Patent.  Patented June 2, 1914.

No Drawing.  Application filed February 26, 1913.  Serial No. 750,887.

*To all whom it may concern:*

Be it known that we, HEINRICH HEIMANN and PAUL VIRCK, citizens of the German Empire, residing at Dessau, Germany, our post-office addresses being, respectively, Friedrich-Schneider strasse 63, Dessau, Germany, and Elisabethstrasse 40, Dessau, Germany, have invented certain new and useful Improvements in Sulfur Dyes and Processes of Making Same, of which the following is a specification.

We have found that new valuable sulfur dyes are obtained by acting with sulfur or a polysulfid or another suitable sulfurizing agent upon mixtures of a derivative of para-hydroxydiphenylamin possessing the general formula:

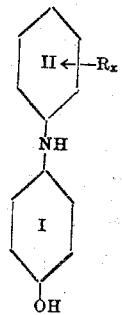

in which formula R means an alkyl group and $x$ means a number less than 6, whereas the nucleus II may contain further substituents and whereas the nucleus I may contain either alkyl groups or other substituents, with an aromatic mono- or diamin, such as for instance anilin, a chloro-anilin, a toluidin, a naphthylamin, a naphthylenediamin, benzidin, a monamino- or a polyamino-carbazole or a derivative thereof, and the like. In the present application we claim besides the invention in its widest scope as to manufacture and new products, more especially those dyes and the manufacture thereof which are obtained with the intervention of an amin of the naphthalene series. Our new dyes thus obtained produce on cotton from a dye-bath containing an alkali-sulfid deep and full tints varying, generally speaking, from brown to black, which tints possess a very good fastness to washing and which tints are very remarkably fast to chlorin, the fastness in this latter direction greatly surpassing that of the known sulfur dyes.

In order to manufacture our new dyes we heat the parent material with sulfur alone to high temperatures; but we may as well act with a suitable mixture of an alkali sulfid and sulfur, such as for instance with a polysulfid of a high percentage of sulfur, or with a mixture of a caustic alkali and sulfur upon a mixture of the above defined class.

The following examples may serve to illustrate our invention, the parts being by weight.

1. A mixture of 40 parts of para′-methyl-para-hydroxydiphenylamin, 28 parts of alpha-naphthylamin and 50 parts of sulfur is heated during about 4 hours to about 200° C., an oil-bath preferably being used. Then the temperature is gradually raised within about 8 hours to about 250° C. The melt thus obtained is soluble in an alkali-sulfid solution, from which solution the new dye may be separated in the usual manner, for instance by introducing a current of air. The new dye thus obtained forms in the dry shape when pulverized a black powder which is practically insoluble or very difficultly soluble in the usual solvents, such as glacial acetic acid, benzene, nitrobenzene, anilin, pyridin and chlorobenzenes. It dissolves in concentrated sulfuric acid to a violet-black solution and in 25% oleum (fuming sulfuric acid) to a black solution, which solutions on the addition of aluminium powder are gradually decolorized. This new dye produces on cotton from a dye-bath containing an alkali-sulfid deep and full violet-brown tints which resist very well the usual chlorin test with bleaching powder.

2. 20 parts of para'-methyl-para-hydroxydiphenylamin, 15 parts of alpha-naphthylamin, 25 parts of sulfur and 10 parts of soda-lye (43° Bé.) are thoroughly mixed together; this mixture is at first heated during about 7–12 hours to 140–180° C., whereupon the temperature is raised and the mass is heated at about 200° C. during 7–12 hours. In order to separate the new dye one may proceed in the usual manner by dissolving the melt in an alkalisulfid and introducing a current of air. But the new dye may also be separated by the addition of common salt to the afore-said solution. The new dye thus obtained produces on cotton from a dye-bath containing an alkali-sulfid deep violet-brown shades of a very remarkable fastness to chlorin.

According to the foregoing indications a new dye may also be prepared from a mixture of para'-methyl-para-hydroxydiphenylamin with beta-naphthylamin. The new dye which can thus be obtained resembles very much the product as manufactured according to Example 2.

It is obvious to those skilled in the art that our present invention is not limited to the foregoing examples or to the details given therein. Firstly we may state that the special conditions of the reaction, such as for instance the duration of the heating or the temperature to be taken as well as the proportions of the respective ingredients, may be varied within wide limits and the results obtained accordingly may vary to some extent. Furthermore, instead of the two naphthylamins used in the foregoing examples, for instance halogenated or nitrated derivatives of naphthylamin or naphthylenediamins or derivatives thereof may be employed. On the other hand other alkylated para-oxydiphenylamins, such as for instance meta'-methyl-para-oxydiphenylamin or para', ortho'-dimethyl-para-oxydiphenylamin may be employed. The new dyes obtained in this way possess similar qualities to the dyes the manufacture of which is given above. We may also state that instead of the aromatic amins the corresponding nitro compounds can be employed; it is obvious that in using such nitro compounds the special conditions of reaction may be altered in order to obtain the best results.

Having now described our invention and the manner in which it may be performed what we claim is:—

1. The hereinbefore-described manufacture of new sulfur dyes which comprises heating with a sulfurizing agent a mixture of an aromatic amin with certain derivatives of para-hydroxydiphenylamin possessing the general formula:

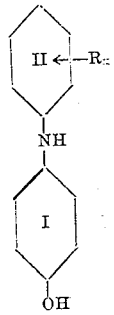

in which formula R means an alkyl group and $x$ a number less than 6.

2. The hereinbefore described manufacture of new sulfur dyes which comprises heating with a sulfurizing agent a mixture of an amin of the naphthalene series with certain derivatives of para-hydroxydiphenylamin possessing the general formula:

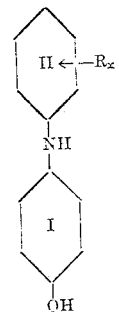

in which formula R means an alkyl group and $x$ a number less than 6.

3. The hereinbefore-described manufacture of new sulfur dyes which comprises heating with a sulfurizing agent a mixture of a naphthylamin with certain derivatives of para-hydroxydiphenylamin possessing the general formula

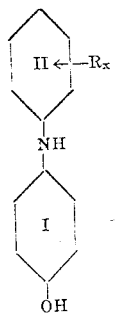

in which formula R means an alkyl group and $x$ a number less than 6.

4. The hereinbefore-described manufacture of new sulfur dyes which comprises heating with a sulfurizing agent a mixture of a naphthylamin with certain derivatives of para-hydroxydiphenylamin possessing the general formula:

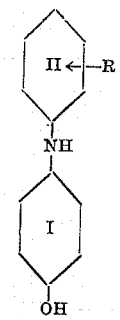

in which formula R means an alkyl group.

5. The hereinbefore-described manufacture of new sulfur dyes which comprises heating with a sulfurizing agent a mixture of alpha-naphthylamin with para'-methyl-para-hydroxydiphenylamin.

6. The hereinbefore-described manufacture of new sulfur dyes which comprises heating with sulfur a mixture of alpha-naphthylamin with para'-methyl-para-hydroxydiphenylamin.

7. The hereinbefore-described manufacture of new sulfur dyes which comprises heating with sulfur and soda-lye a mixture of alpha-naphthylamin with para'-methyl-para-hydroxydiphenylamin.

8. As new articles of manufacture new sulfur dyes derived from certain derivatives of para-hydroxydiphenylamin possessing the general formula

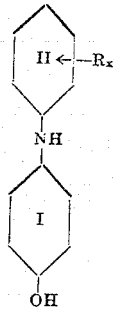

in which formula R means an alkyl group and $x$ a number less than 6, in conjunction with aromatic amins, these new dyes in the dry shape when pulverized being, generally speaking, black powders, which are substantially insoluble in the usual solvents and soluble in concentrated sulfuric acid and in 25% oleum (fuming sulfuric acid), generally speaking, to black solutions, and these new dyes being soluble in an alkali-sulfid and soluble in an alkaline hydrosulfite solution, from which solution cotton is dyed, generally speaking, brown to black tints, and these new dyes producing on cotton from a dye-bath containing an alkali, sulfid, generally speaking, brown to black tints, which tints are fast to washing and remarkably fast to chlorin.

9. As new articles of manufacture new sulfur dyes derived from certain derivatives of para-hydroxydiphenylamin possessing the general formula:

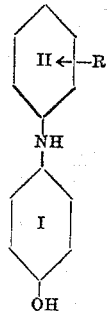

in which formula R means an alkyl group, in conjunction with aromatic amins, these new dyes in the dry shape when pulverized being, generally speaking, black powders, which are substantially insoluble in the usual solvents, and soluble in concentrated sulfuric acid and in 25% oleum (fuming sulfuric acid), generally speaking, to black solutions, and these new dyes being soluble in an alkali sulfid, and soluble in an alkaline hydrosulfite solution, from which solution cotton is dyed, generally speaking, brown to black tints, and these new dyes producing on cotton from a dye-bath containing an alkali-sulfid, generally speaking, brown to black tints, which tints are fast to washing and are remarkably fast to chlorin.

10. As a new article of manufacture a new sulfur dye derived from para'-methyl-para-hydroxydiphenylamin in conjunction with alpha-naphthylamin, which new dye in the dry shape when pulverized forms a black powder substantially insoluble in glacial acetic acid, alcohol, benzene, nitrobenzene, anilin, pyridin and chlorobenzenes, and which new dye dissolves in concentrated sulfuric acid to a violet-black solution and in 25% oleum to a black solution, which solutions by addition of aluminium powder are gradually decolorized, this new dye dissolving in an alkaline hydrosulfite solution to an orange vat from which cotton is dyed violet-brown tints, and which new dye produces on cotton without a mordant containing an alkali-sulfid deep and full violet-brown tints which resist very well the usual chlorin tests with bleaching powder.

In testimony whereof we have hereunto set our hands in presence of two subscribing witnesses.

HEINRICH HEIMANN.
PAUL VIRCK.

Witnesses:
RUDOLPH FRICKE,
DORIS KRAHL.